United States Patent [19]

Ito

[11] Patent Number: 5,215,053
[45] Date of Patent: Jun. 1, 1993

[54] FUEL INJECTION CONTROL DEVICE FOR AN INTERNAL COMBUSTION ENGINE

[75] Inventor: Yasushi Ito, Susono, Japan

[73] Assignee: Toyota Jidosha Kabushiki Kaisha, Toyota, Japan

[21] Appl. No.: 809,011

[22] Filed: Dec. 17, 1991

[30] Foreign Application Priority Data

Dec. 19, 1990 [JP] Japan .................. 2-403441

[51] Int. Cl.$^5$ ............................................ F02F 3/26
[52] U.S. Cl. ............................... 123/276; 123/305
[58] Field of Search ............... 123/276, 275, 274, 295, 123/299, 357, 300, 299, 305, 256, 261, 357

[56] References Cited

U.S. PATENT DOCUMENTS

| | | | |
|---|---|---|---|
| 3,709,672 | 12/1987 | Ishida | 123/256 |
| 3,996,915 | 12/1986 | Demetrescu | 123/169 |
| 4,621,599 | 11/1986 | Igashira et al. | 123/300 |
| 4,852,525 | 8/1989 | Ishida | 123/256 |
| 4,920,937 | 5/1990 | Sasaki et al. | 123/305 |
| 4,955,339 | 9/1990 | Sasaki et al. | 123/295 |
| 4,958,604 | 9/1990 | Hashimoto | 123/276 |
| 5,090,379 | 2/1992 | Ito | 123/299 |
| 5,101,785 | 4/1992 | Ito | 123/357 |
| 5,103,776 | 4/1992 | Sato | 123/261 |
| 5,109,816 | 5/1992 | Sasaki | 123/276 |

FOREIGN PATENT DOCUMENTS 2424514 4/1975 Fed. Rep. of Germany .
51-001816 9/1976 Japan .

OTHER PUBLICATIONS

Copending U.S. patent application 662,480 (Filing date Feb. 28, 1991).
Copending U.S. patent application 682,689 (Filing date Apr. 9, 1991).
Copending U.S. patent application 706,646 (Filing date May 29, 1991).

*Primary Examiner*—Raymond A. Nelli
*Attorney, Agent, or Firm*—Kenyon & Kenyon

[57] ABSTRACT

A fuel injection control device for an internal combustion engine, comprising a control unit for controlling a control pattern of a fuel injection of the fuel injector to be a first control pattern when an engine load is smaller than a predetermined threshold engine load and to be a second control pattern when the engine load is larger than the predetermined threshold engine load, and a changing unit for changing the predetermined threshold engine load such that an optimum performance of the engine is obtained.

30 Claims, 16 Drawing Sheets

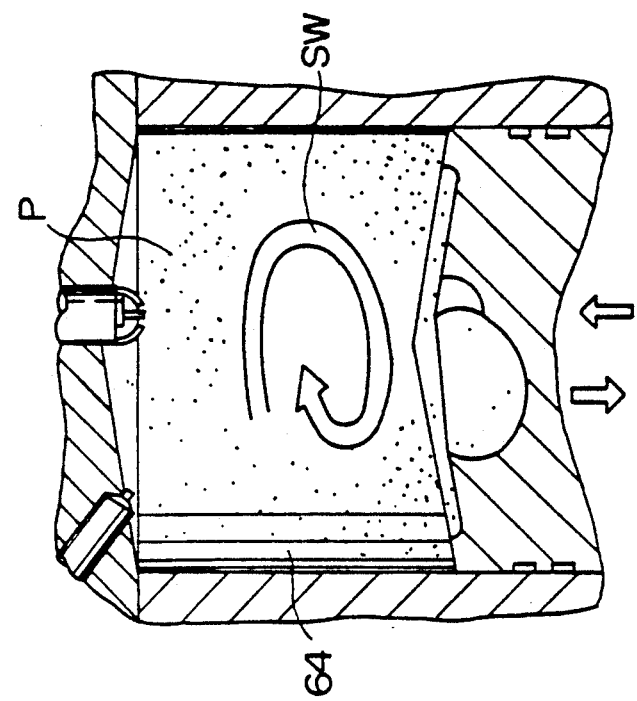
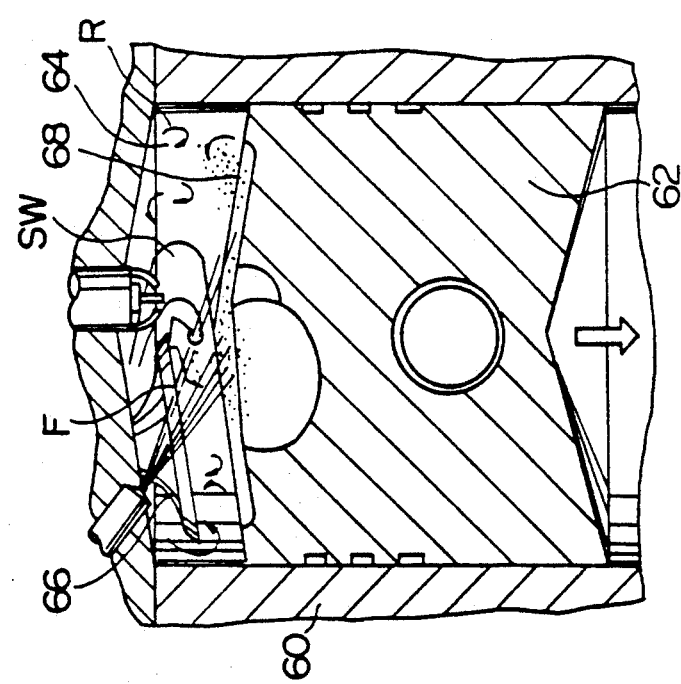

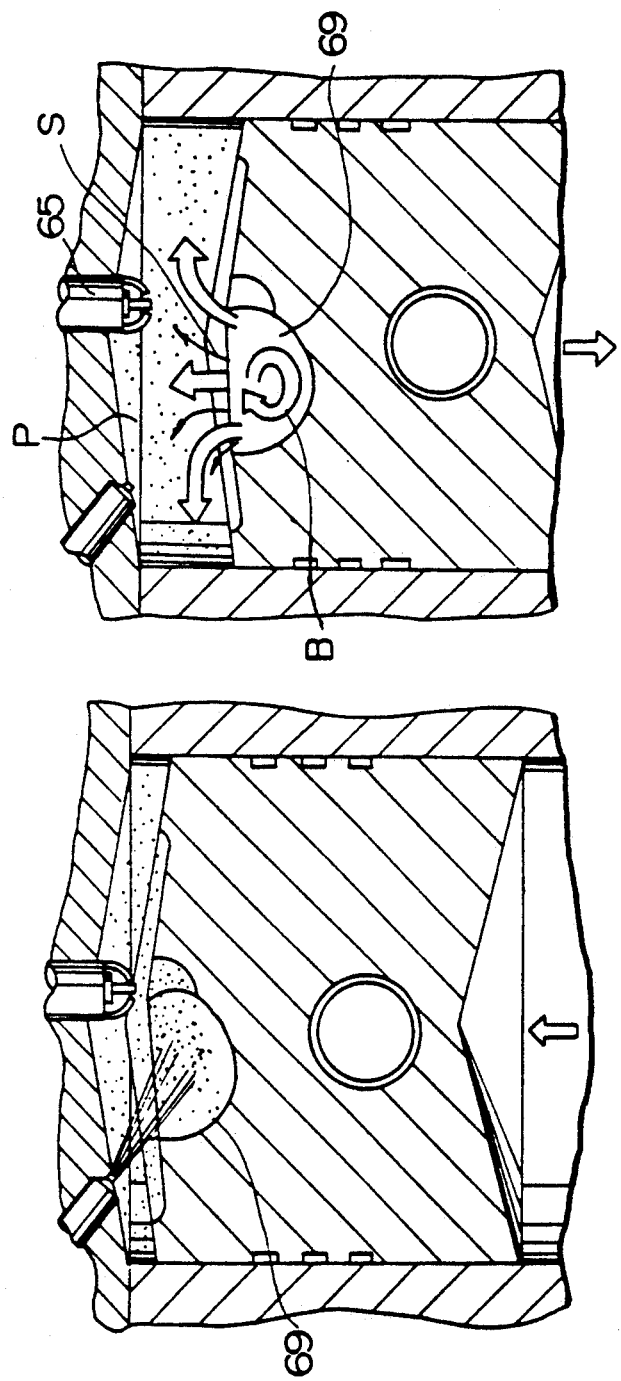

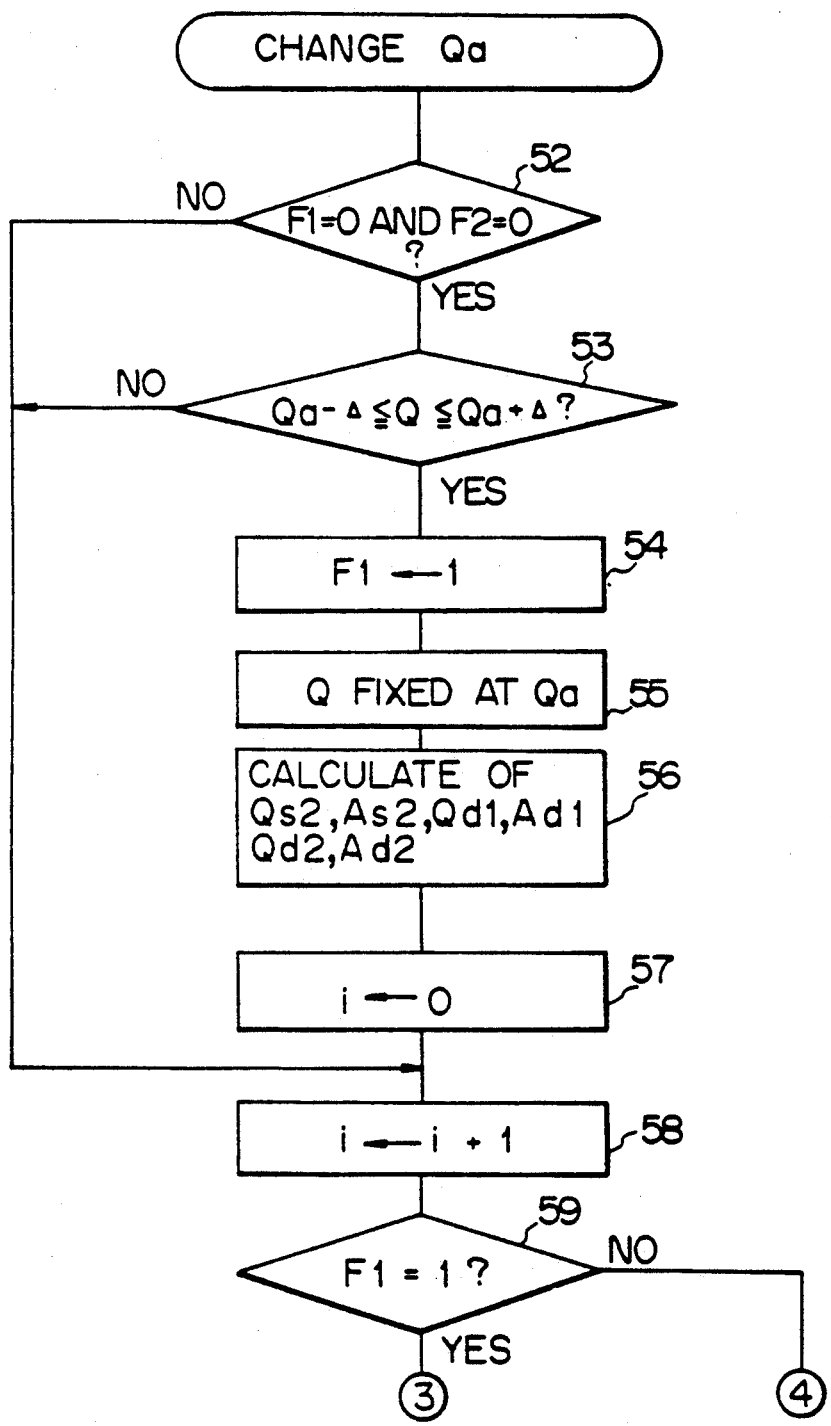

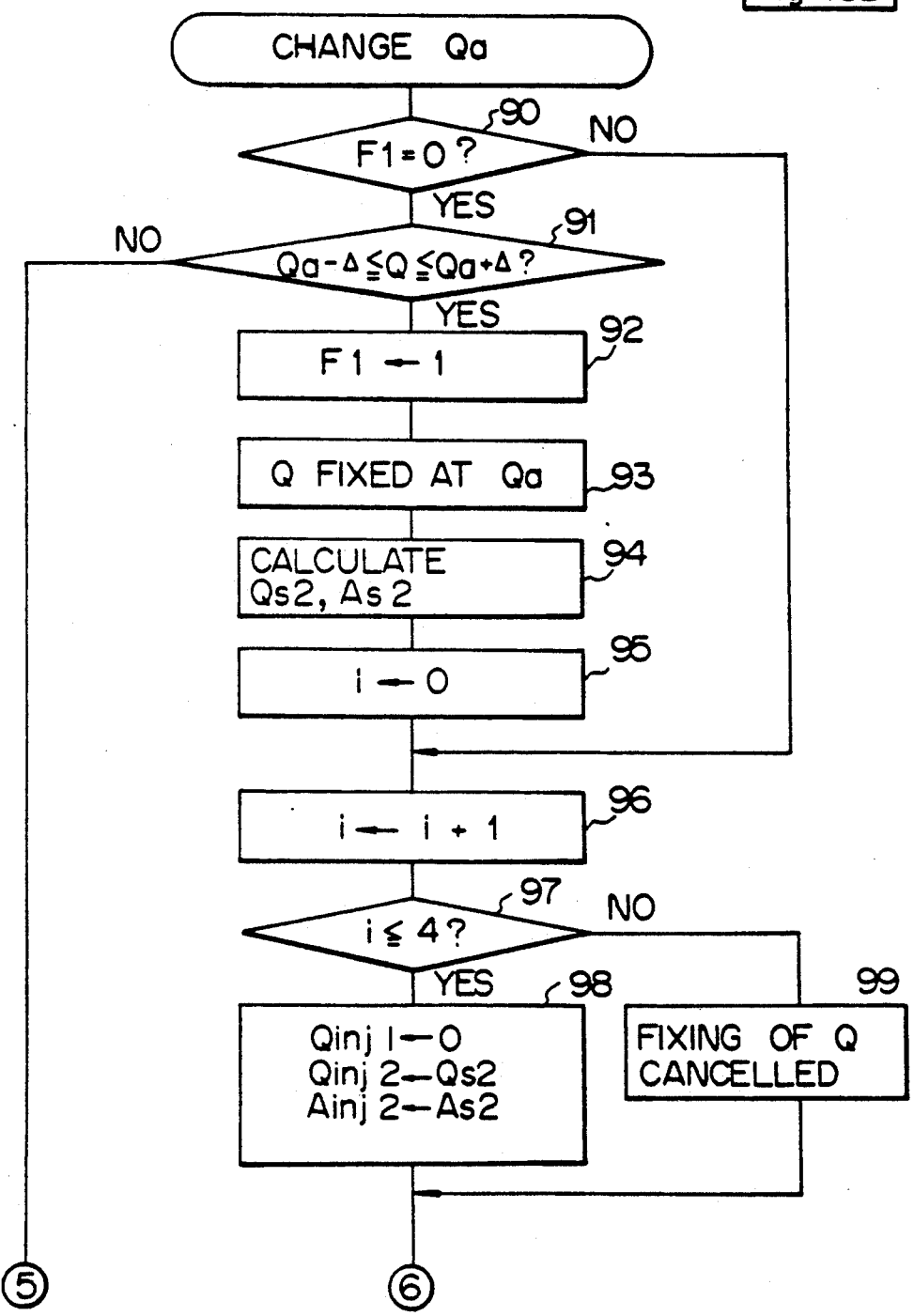

FUEL INJECTION CONTROL DEVICE FOR AN INTERNAL COMBUSTION ENGINE

BACKGROUND OF THE INVENTION

1. Field of the Invention

The present invention relates to a fuel injection control device for an internal combustion engine.

2. Description of the Related Art

Japanese Unexamined Patent Publication No. 2-169834 discloses an internal combustion engine having a spark plug and a fuel injector for injecting fuel directly into the cylinder, wherein, at a low engine load, a fuel injection is carried out only during a compression stroke, i.e., the fuel injector injects all of an amount of fuel to be injected during approximately the latter half of the compression stroke, and at a middle or high engine load, a divided fuel injection is carried out, i.e., the fuel injector injects a part of an amount of fuel to be injected during an intake stroke, and injects a remaining part of the amount of fuel to be injected during a compression stroke.

In this engine, a performance of the engine, for example, an engine torque, an amount of $NC_x$ produced, or an amount of smoke produced, is considerably changed when a control pattern of a fuel injection (e.g., a fuel injection only during an intake stroke, a fuel injection only during a compression stroke, a divided fuel injection during the intake and the compression stroke) is changed. Accordingly, a problem arises in that the full output of the engine cannot be obtained when a predetermined changing engine load (threshold engine load), at which the control pattern of the fuel injection is changed, is not properly determined.

For example, as shown in FIG. 6, an engine torque corresponding to the fuel injection only during the compression stroke is shown by a curve A, and an engine torque corresponding to the divided fuel injection is shown by a curve B. When the changing engine load is equal to $Q_X$, i.e., an engine load corresponding to a point at which the curve A and the curve B cross, a full engine torque can be obtained. When the changing engine load is equal to $Q_Y$, i.e., is smaller than $Q_X$, however, a problem arises in that the full engine torque can not be obtained between $Q_Y$ and $Q_X$ because the engine torque corresponding to the curve B is smaller than the engine torque corresponding to the curve A between $Q_Y$ and $Q_X$. Also, a similar problem arises when the changing engine load is equal to $Q_Z$, which is larger than $Q_X$.

SUMMARY OF THE INVENTION

An object of the present invention is to provide a fuel injection control device for an internal combustion engine, by which the above problem is solved.

According to the present invention, there is provided a fuel injection control device for an internal combustion engine having a cylinder, a piston introduced into the cylinder, and a fuel injector, the fuel injection control device comprising: a control means for controlling a control pattern of a fuel injection of the fuel injector to be a first control pattern when an engine load is smaller than a predetermined threshold engine load and to be a second control pattern when the engine load is larger than the predetermined threshold engine load; and a changing means for changing the predetermined threshold engine load such that an optimum performance of the engine is obtained.

The present invention may be more fully understood from the description of preferred embodiment of the invention set forth below, together with the accompanying drawings.

BRIEF DESCRIPTION OF THE DRAWINGS

In the drawings:

FIGS. 5A through 5D illustrates an operation of the embodiment;

FIG. 7 Keys together FIGS. 7A & 7B

FIG. 11 Keys together FIGS. 11A & 11B.

FIGS. 11A and 11B are flowcharts of the routine for changing the changing engine load $Q_a$ according to the second embodiment;

FIG. 13 Keys together FIGS. 13A & 13B.

FIGS. 13A and 13B are flowcharts of the routine for changing the changing engine load $Q_a$ according to the third embodiment.

DESCRIPTION OF THE PREFERRED EMBODIMENTS

Figure 1:
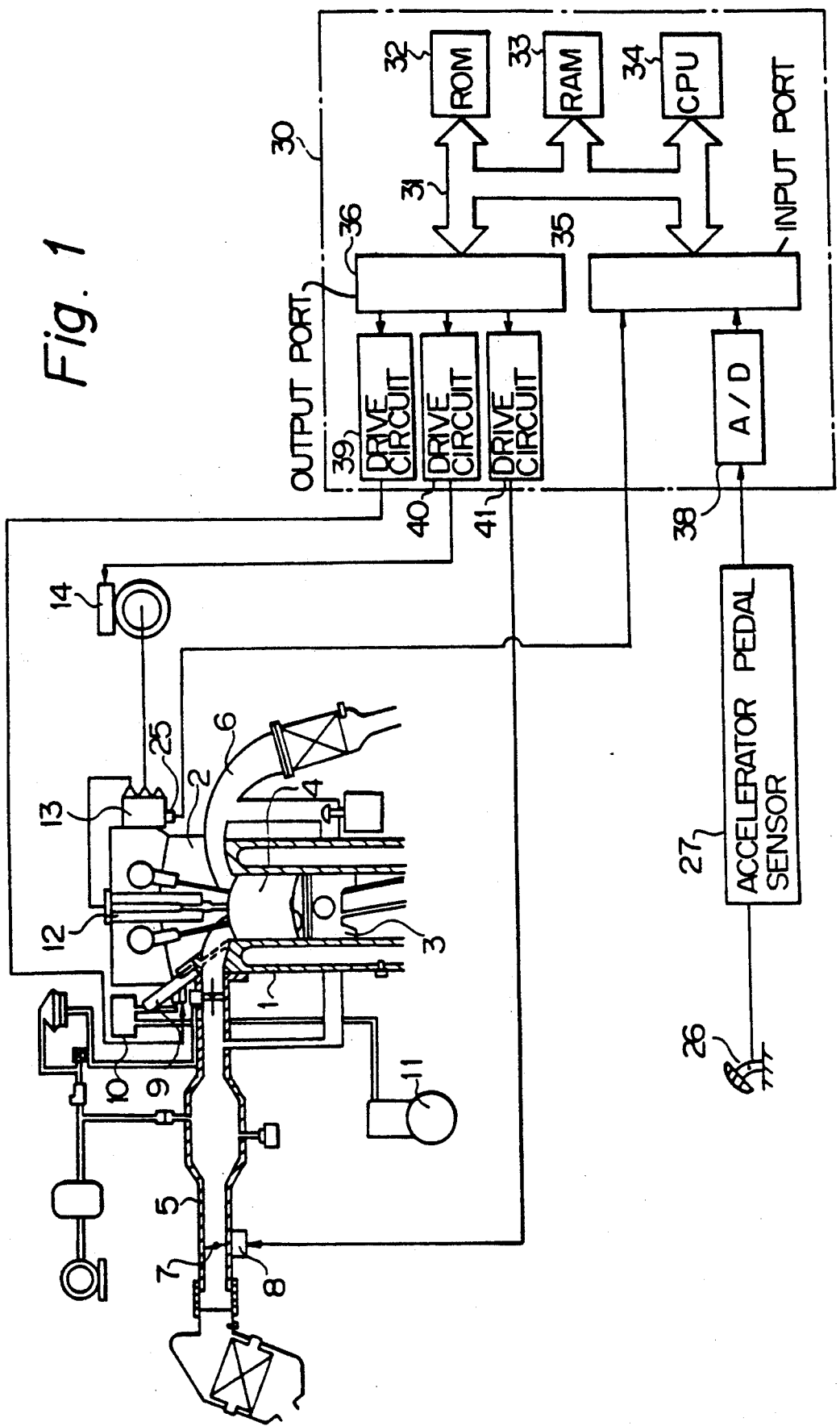
FIG. 1 is a schematic view of a four-cylinder gasoline engine for a first embodiment.

A first embodiment of the present invention is now described. Referring to FIG. 1, reference numeral 1 designates a cylinder block, 2 a cylinder head, 3 a piston, 4 a cylinder chamber, 5 an intake passage, and 6 an exhaust passage. A linkless throttle valve 7 is arranged in the intake passage 5, and is driven by a step motor 8 to be substantially fully open at an engine running state other than an idling running state and reduction running state. The tip of a fuel injector 9 is extended into the cylinder chamber 4, and thus the fuel injector 9 can directly inject fuel into the cylinder chamber 4. Each fuel injector 9 corresponding to each cylinder is connected to a common reservoir tank 10, which is filled with fuel supplied thereto under a constant high pressure by a fuel pump 11. A spark plug 12 is connected to an igniter 14 via a distributor.

The electronic control unit 30 is constructed as a digital computer and includes a ROM (read only memory) 32, a RAM (random access memory) 33, a CPU (microprocessor, etc.) 34, an input port 35, and an output port 36. The ROM 32, the RAM 33, the CPU 34, the input port 35, and the output port 36 are interconnected via a bidirectional bus 31. The distributor 13 is provided with a crank angle sensor 25 for detecting an engine speed; the crank angle sensor 25 being connected to the input port 35. An accelerator pedal sensor 27 for detecting a degree $\theta A$ of opening of an accelerator pedal 26 is also connected to the input port 35, via an AD converter 38.

The output port 36 is connected to the fuel injector 9, the igniter 14, and the step motor 8 via corresponding drive circuits 39, 40, 41 respectively.

Figure 2:
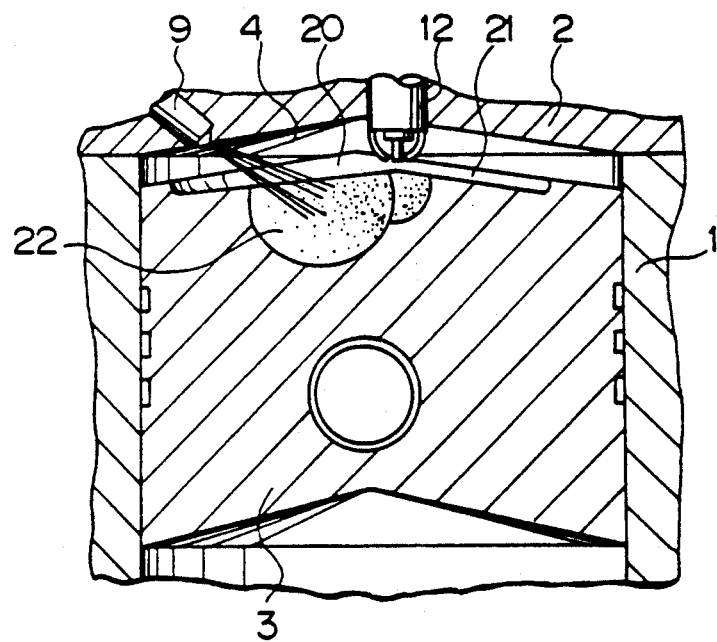
FIG. 2 is a cross-sectional side view of the engine to which the embodiment of the present invention is applied.

Referring to FIG. 2, a concave combustion chamber 20 formed on the top of the piston 3 comprises a shallow cavity 21 and a deep cavity 22 formed at the approximate center of the shallow cavity 21, and the shallow cavity 21 has a diameter larger than that of the deep cavity 22. An intake port is formed as a swirl port (not shown) and the fuel injector 9 has a plurality of nozzle openings. Fuel injected from the fuel injector 9 has a small spread angle and the speed of the injected fuel, along the direction of the fuel injection, is relatively fast. The fuel injector 9 is arranged on the top of the cylinder chamber 4, and inclined downward. The direction of the fuel injection and the fuel injection timing of the fuel injector 9 are determined to direct the fuel injected from the fuel injector 9 to the combustion chamber 20. The spark plug 12 is arranged in the combustion chamber 20 when the piston 3 is at TDC.

Figure 3:
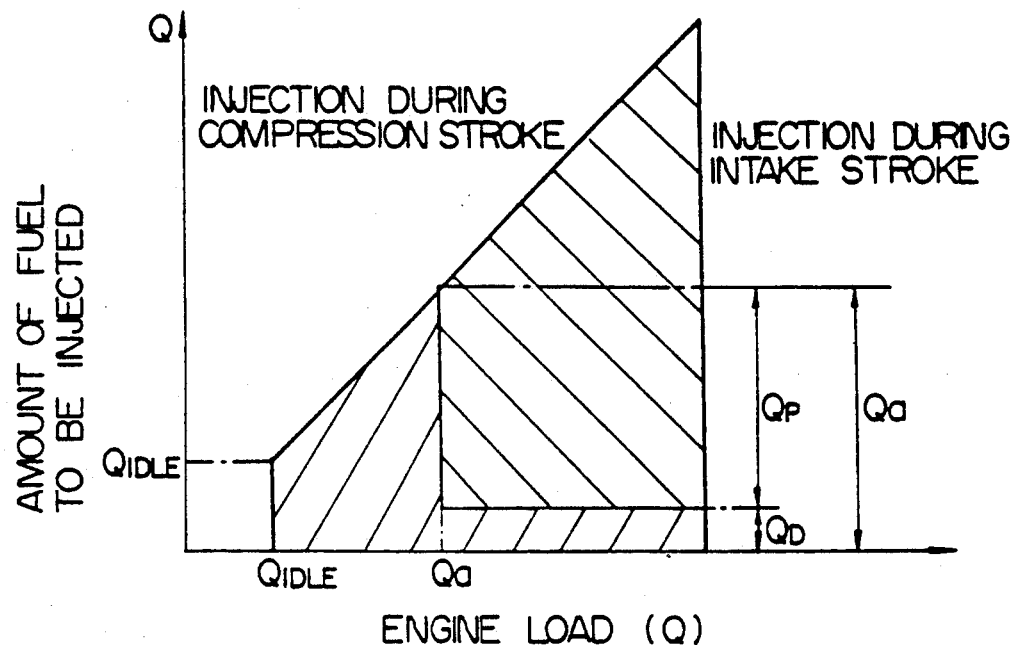
FIG. 3 is a diagram illustrating a control pattern of a fuel injection of the embodiment of the present invention.

FIG. 3 illustrates an example of a control pattern of a fuel injection. Referring to FIG. 3, the horizontal axis represents an engine load and the vertical axis represents an amount Q of fuel to be injected. As the engine load corresponds to the amount of fuel to be injected, in FIG. 3 the engine load is represented by the amount Q of fuel to be injected. The amount Q of fuel to be injected is calculated on the basis of an engine speed $N_e$ and a degree of opening $\theta A$ of the accelerator pedal 26.

When the calculated amount of fuel to be injected is equal to or larger than the amount $Q_{IDLE}$ of fuel for idling and smaller than $Q_a$, all of the calculated amount of fuel is injected during a compression stroke, i.e., a fuel injection only during the compression stroke is carried out. At this time, the amount of fuel to be injected during the compression stroke is increased from an amount $Q_{IDLE}$ of fuel for idling to an amount $Q_a$ of fuel for the medium engine load, in accordance with the increase of the engine load. When the calculated amount of fuel to be injected is equal to $Q_a$, the amount of fuel to be injected during the compression stroke is rapidly reduced from $Q_a$ to $Q_D$ and an amount of fuel to be injected during an intake stroke is rapidly increased from 0 to $Q_P$. $Q_a$, as calculated from the following equation, is an amount of fuel corresponding to a medium load.

$$Q_a = Q_D + Q_P$$

where, $Q_D$ represents a first minimum amount of fuel to be injected during the compression stroke for forming an air-fuel mixture which can be ignited by the spark plug 12, and $Q_P$ represents a second minimum amount of fuel to injected during the intake stroke for forming an air-fuel mixture in which a flame can be propagated even when the injected fuel is uniformly diffused in the cylinder chamber 4. The first minimum amount $Q_D$ of fuel for an ignition is considerably smaller than an amount $Q_{IDLE}$ of fuel for idling.

When the calculated amount of fuel to be injected is larger than $Q_a$, a part of the calculated amount of fuel is injected during the intake stroke and a remaining part of the calculated amount of fuel is injected during the compression stroke, i.e., a divided fuel injection is carried out. At this time, the amount of fuel to be injected during the compression stroke is constant at $Q_D$ and the amount of fuel to be injected during the intake stroke is increased in accordance with the increase of the engine load.

Since $Q_a$ is an engine load for changing the control pattern of a fuel injection, $Q_a$ is called a changing engine load (threshold engine load).

Figure 4:
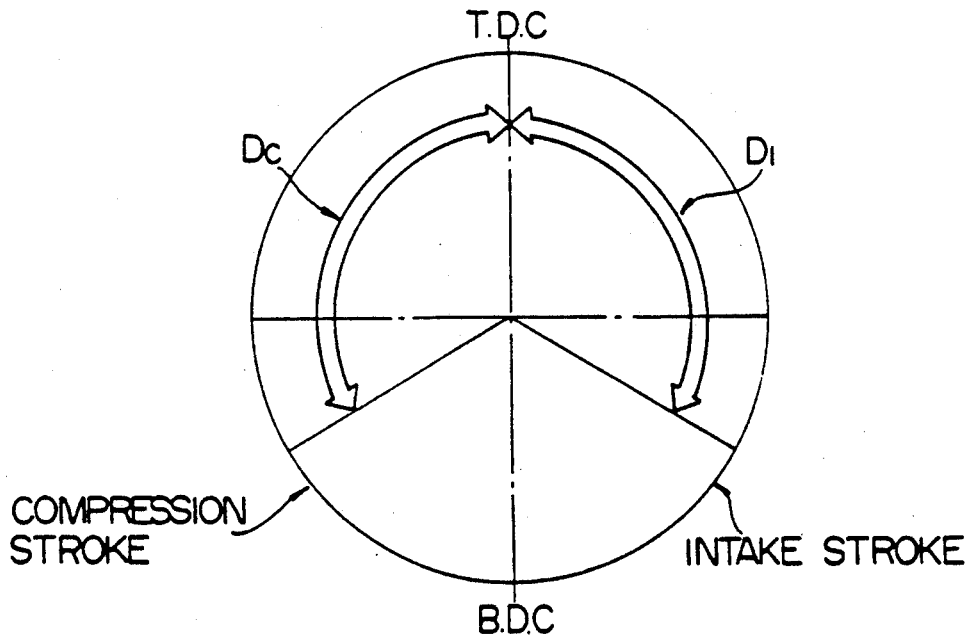
FIG. 4 is a diagram illustrating a fuel injection timing.

FIG. 4 illustrates a fuel injection period. Referring to FIG. 4, a fuel injection during the intake stroke is carried out within a period shown by $D_I$. This period $D_I$ corresponds to approximately a first half of the intake stroke. A fuel injection during the compression stroke is carried out within a period shown by $D_C$. The term $D_C$ corresponds to approximately a latter half of the compression stroke. The term $D_I$ and the term $D_C$ are symmetric with respect to the line connecting T.D.C and B.D.C in FIG. 4. As fuel is injected within the term $D_I$ or $D_C$, injected fuel does not directly impinge on the inner face of the cylinder block 1, and therefore, little injected fuel adheres to the inner surface of the cylinder block 1.

Referring to FIG. 2 and FIG. 3, when the calculated amount of fuel to be injected is smaller than the changing engine load $Q_a$, i.e., when the engine load is low, all of the calculated amount of fuel to be injected is injected to the combustion chamber 20 during approximately the latter half of the compression stroke (FIG. 4). As the fuel injection timing is delayed, most of the fuel is injected into the deep cavity 22. Fuel adhered to the inner wall of the deep cavity 22 is evaporated and becomes a mist, to form an air-fuel mixture in the combustion chamber 20. The air-fuel mixture has an air-fuel ratio of from rich to lean, and therefore, an inflammable air-fuel mixture exists. This air-fuel mixture is ignited by the spark plug 12 and burns best in the deep cavity 22.

When the calculated amount Q of fuel to be injected is larger than $Q_a$, a part of the calculated amount Q of fuel is injected from the fuel injector 9 to the combustion chamber 20 during approximately the first half of the intake stroke (FIG. 5A). The injected fuel F is impinged mainly on the shallow cavity 21, a part of the impinged fuel is reflected to the cylinder chamber 4, and a remaining part of the impinged fuel is adhered to the inner wall of the shallow cavity 21 and then evaporated and becomes mist due to the heat of the inner wall of the shallow cavity 21. The injected fuel is diffused in the cylinder chamber 4 by a swirl SW and a turbulent flow R so that an air-fuel premixture P is formed in the cylinder chamber 4 (FIG. 5B). The air fuel ratio of the air-fuel premixture P is such that a flame can be easily propagated. When a swirl SW is strong, an air-fuel premixture is formed such that the air-fuel ratio of the air-fuel premixture near the inner wall of the cylinder block 1 is rich and the air-fuel ratio of the air-fuel premixture near the center of the cylinder chamber 4 is lean.

Note, when the fuel injection timing is advanced, i.e., fuel is injected when the piston 3 is close to TDC, most of the fuel is injected into the deep cavity 22 and the injected fuel is evaporated mainly in the deep cavity 22.

A remaining part of the calculated amount of fuel is injected from the fuel injector 9 into the deep cavity 22 during approximately the latter half of the compression stroke (FIG. 5C). Fuel adhered to the inner wall of the deep cavity 22 is evaporated by heat from the inner wall of the deep cavity 22 and from a compressed gas, and thus an air-fuel mixture is formed in the combustion chamber 4. The air-fuel mixture is nonuniform and has an air-fuel ratio of from rich to lean, and thus an inflammable air-fuel mixture exists. This nonuniform air-fuel mixture is ignited by the spark plug 12 and thus burnt (FIG. 5D). The flame B in the deep cavity 22 is propagated to the air-fuel premixture and the combustion is expanded to the outside of the deep cavity 22 by a reverse squish flow S.

Note, when a fuel injection during the compression stroke is advanced, i.e., fuel is injected to both the shallow cavity 21 and the deep cavity 22, the flame is distributed over the shallow cavity 21 and the deep cavity 22, and therefore, the propagation of the flame to the air-fuel premixture becomes easier.

Figure 6:
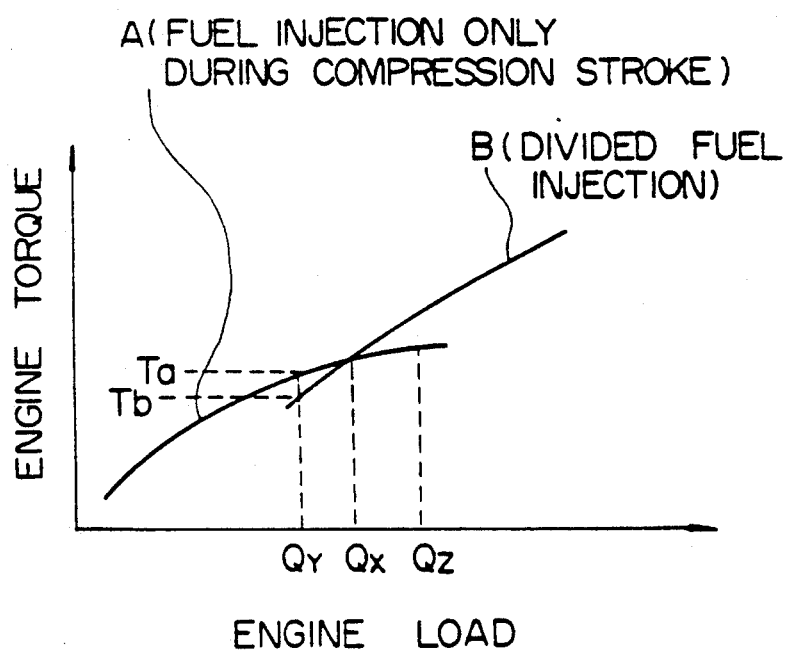
FIG. 6 is a diagram illustrating a relationship between an engine load and an engine torque, when a fuel injection only during a compression stroke and a divided fuel injection are carried out, respectively.

Note, as shown in FIG. 6, the engine torque is changed when the control pattern of the fuel injection is changed, i.e., from the fuel injection only during the compression stroke to the divided fuel injection, or vice versa. In FIG. 6, the engine torque corresponding to the fuel injection only during the compression stroke is shown by a curve A, and the engine torque corresponding to the divided fuel injection is shown by a curve B. When the changing engine load is equal to $Q_X$, i.e., an engine load corresponding to a point at which the curve A and the curve B cross, a full engine torque is obtained. When the changing engine load is equal to $Q_Y$, i.e., is smaller than $Q_X$, however, a problem arises in that a torque shock occurs when the engine torque is changed from $T_a$ to $T_b$ at $Q_Y$ and the full engine torque can not be obtained between $Q_Y$ and $Q_X$, because the engine torque corresponding to the curve B is smaller than the engine torque corresponding to the curve A between $Q_Y$ and $Q_X$. Also, a similar problem arises when the changing engine load is equal to $Q_Z$, which is larger than $Q_X$.

Therefore, according to the first embodiment of the present invention, the fuel injection only during the compression stroke, and the divided fuel injection, are carried out alternately in the firing order, the engine torque corresponding to the fuel injection only during the compression stroke and the engine torque corresponding to the divided fuel injection are calculated on the basis of a time required for a rotation of 180° CA (crank angle), and the changing engine load is renewed by comparing these engine torques. As a result, the changing engine load is brought close to $Q_X$ in FIG. 6.

Figure 7A:
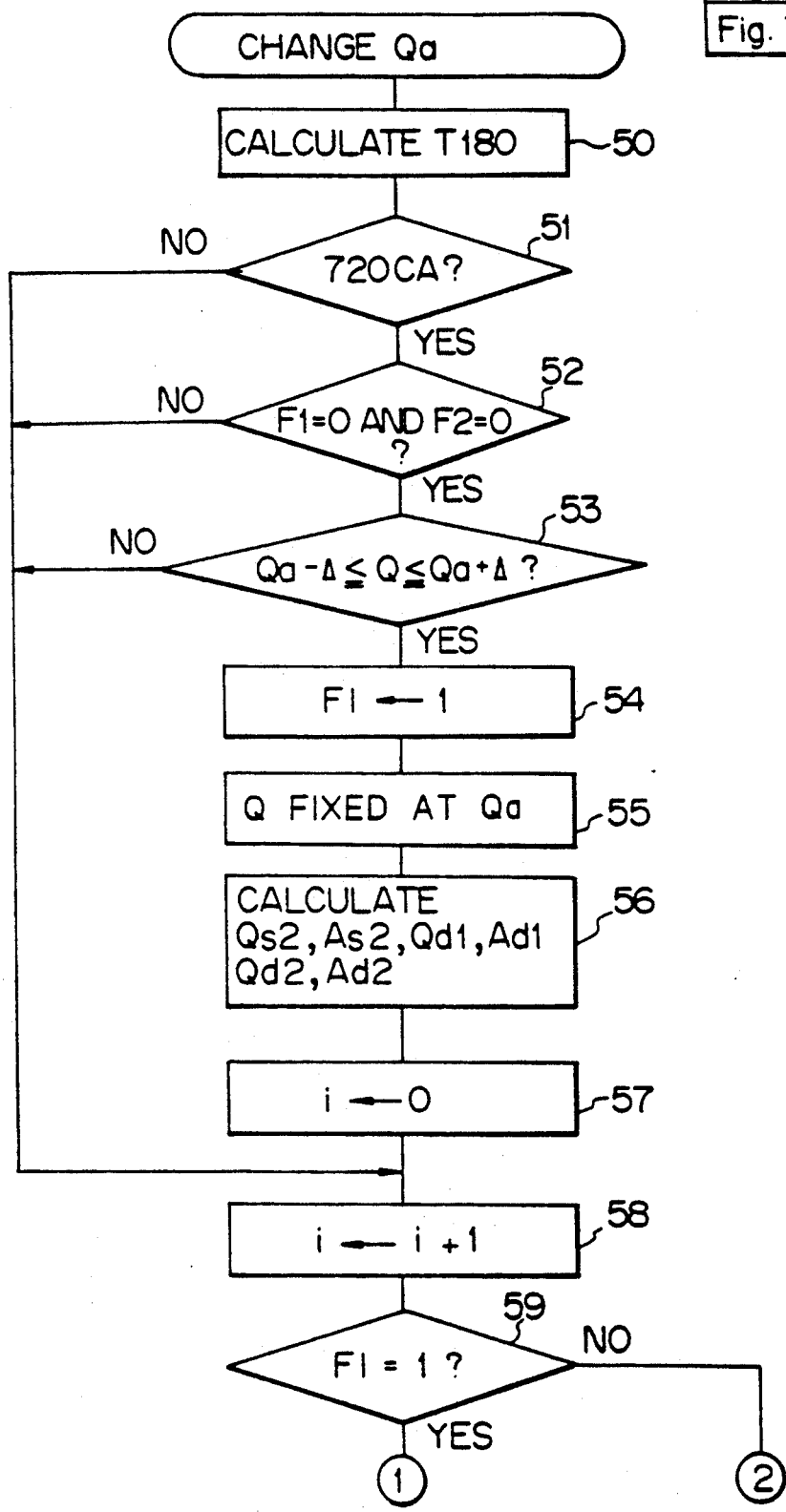
FIGS. 7A and 7B are flowcharts for changing a changing engine load $Q_a$ according to the first embodiment.
Figure 7B:
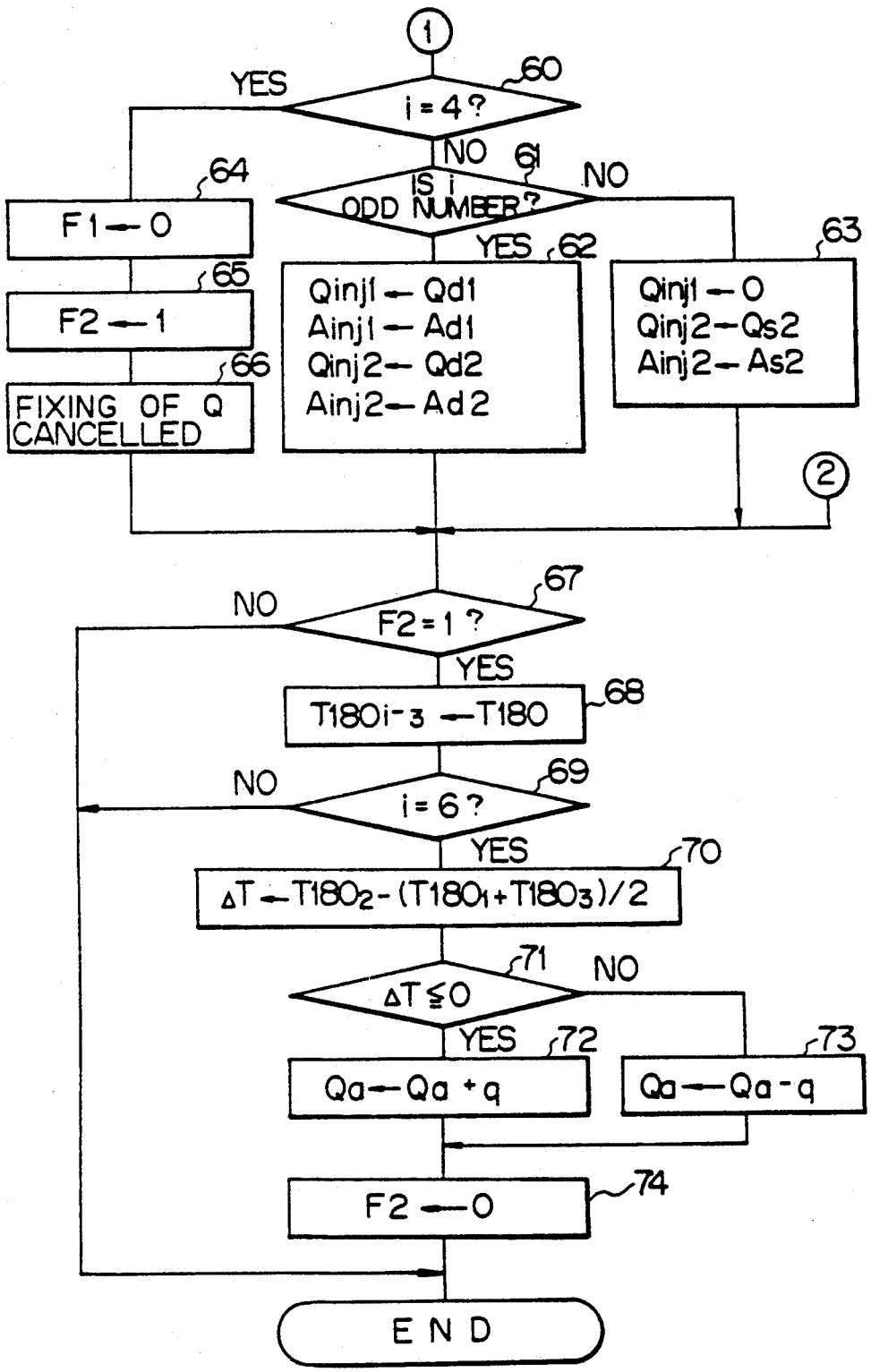

FIGS. 7A and 7B illustrate a routine for changing the changing engine load $Q_a$ according to the first embodiment. This routine is processed by sequential interruptions executed at 180° CA.

Referring to FIGS. 7A and 7B, at step 50, the time T180 for a rotation of 180° CA is calculated on the basis of the signal output by the crank angle sensor 25, and at step 51, when the result is YES at every 720° CA, for example, the result is YES at every TDC (top dead center) during the intake stroke of No. 1 cylinder. At step 52, it is determined whether or not a control flag F1 and a changing flag F2 are reset. When the result is YES, the routine goes to step 53 and it is determined whether or not the following expression is satisfied.

$$Q_a - \Delta \leq Q \leq Q_a + \Delta$$

where Q is a calculated amount of fuel to be injected and $\Delta$ is considerably smaller than changing engine load $Q_a$.

When $Q_a - \Delta \leq Q \leq Q_a + \Delta$, i.e., Q is substantially equal to $Q_a$, the routine goes to step 54 and the control flag F1 is set to 1. Then, at step 55, the amount Q of fuel to be injected is fixed at $Q_a$, corresponding to the changing engine load. Therefore, since Q is made equal to $Q_a$ when Q is substantially equal to $Q_a$, an output power of the engine is not greatly changed. At step 56, the amount $Q_s2$ of fuel to be injected during the compression stroke and the fuel injection timing $A_s2$ during the compression stroke for the fuel injection only during the compression stroke, the amount $Q_d1$ of fuel to be injected during the intake stroke and the fuel injection timing $A_d1$ during the intake stroke for the divided fuel injection, and the amount $Q_d2$ of fuel to be injected during the compression stroke and the fuel injection timing $A_d2$ during the compression stroke for the divided fuel injection, are calculated on the basis of $Q_a$ and an engine speed $N_e$. At step 57, i is made 0, and at step 58, i is incremented by 1 at every 180° CA.

When the result is NO at any one of steps 51, 52, and 53, step 54 through step 57 are skipped. Then, at step 59, it is determined whether or not the control flag F1 is set to 1. When F1 is reset, the routine jumps to step 67. Conversely, when F1 is set, the routine goes to step 60 and it is determined whether or not i is equal to 4. First, since i is equal to 1, the routine goes to step 61 and it is determined whether or not i is an odd number, but since i is equal to 1, the routine goes to step 62. At step 62, $Q_d1$ is stored as $Q_{inj}1$, $A_d1$ is stored as $A_{inj}1$, $Q_d2$ is stored as $Q_{inj}2$, and $A_d2$ is stored as $A_{inj}2$. Then the divided fuel injection is carried out on the basis of $Q_{inj}1$, $A_{inj}1$, $Q_{inj}2$, and $A_{inj}2$ by another routine (not shown).

In the next processing cycle, since i is equal to 2, the routine goes to step 63. At step 63, $Q_{inj}1$ is made 0, $Q_s2$ is stored in $Q_{inj}2$, and $A_s2$ is stored in $A_{inj}2$. Then the fuel injection only during the compression stroke is carried out, on the basis of $Q_{inj}2$ and $A_{inj}2$ by another routine (not shown).

Figure 8:
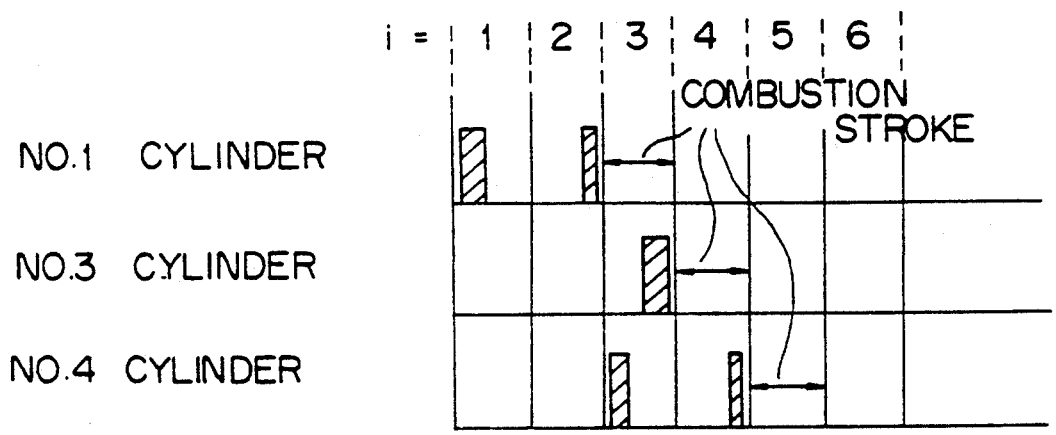
FIG. 8 is a diagram illustrating a fuel injection timing corresponding to each cylinder in relation to i.

In the next processing cycle, since i is equal to 3, the routine again goes to step 62 and the divided fuel injection is then carried out. In the next processing cycle, since i is equal to 4, the result is YES at step 60 and the routine goes to step 64. At step 64, the control flag F1 is reset, at step 65, the changing flag F2 is set, and at step 66, the fixing of Q to $Q_a$ is cancelled. Accordingly, as shown in FIG. 8, the divided fuel injection is carried out in No. 1 cylinder, then the fuel injection only during the compression stroke is carried out in No. 3 cylinder, and then the divided fuel injection is carried out in No. 4 cylinder.

At step 67 in FIG. 7B, it is determined whether or not the changing flag F2 is set. When i is equal to 1 through 3, since F2 is reset, the result is NO at step 67 and the routine is completed. Conversely, when i is equal to 4, since F2 is set at step 65, the result is YES at step 67 and the routine goes to step 68. At step 68, T180 is stored in $T180_{i-3}$, but since i is equal to 4, T180 is stored in $T180_1$. Note, T180 is calculated when i is equal to 4, and designates the time for a rotation by 180° CA. As shown in FIG. 8, when i=3, a combustion is carried out in No. 1 cylinder (a combustion stroke in No. 1 cylinder). Accordingly, $T180_1$ designates the time for a rotation by 180° CA during the combustion stroke in No. 1 cylinder when the divided fuel injection was carried out, i.e., the torque produced by the combustion in No. 1 cylinder when the divided fuel injection was carried out. Similarly, $T180_2$ designates the torque produced by the combustion in No. 3 cylinder when the fuel injection only during the compression stroke was carried out, and $T180_3$ designates the torque produced by the combustion in No. 4 cylinder when the divided fuel injection was carried out.

At step 69, it is determined whether or not i is equal to 6. When i is equal to 4 or 5, the result is NO and the routine is completed. Conversely, when i is equal to 6, the routine goes to step 70 and $\Delta T$ is calculated from the following equation.

$$\Delta T = T180_2 - (T180_1 + T180_3)/2$$

where $T180_2$ designates T180 during the combustion stroke in the cylinder in which the fuel injection only during the compression stroke was carried out, and $(T180_1 + T180_3)/2$ designates an average of T180 during the combustion stroke in the cylinders in which the divided fuel injection was carried out.

At step 71, it is determined whether or not $\Delta T$ is equal to or smaller than 0. When $\Delta T \leq 0$, i.e., $T180_2 \leq (T180_1 + T180_3)/2$, i.e., a first engine torque during the combustion stroke in the cylinder in which the fuel injection only during the compression stroke was carried out is larger than a second engine torque during the combustion stroke in the cylinder in which the divided fuel injection was carried out (when $Q_a$ is smaller than $Q_X$ in FIG. 6), the routine goes to step 72 and the changing engine load $Q_a$ is increased by q, which is sufficiently small, and $\Delta T \leq 0$, $Q_a$ is increased by q at every processing cycle, and thus becomes close to $Q_X$. Conversely, when $\Delta T > 0$, i.e., $T180_2 > (T180_1 + T180_3)/2$, i.e., the first engine torque is smaller than the second engine torque (when $Q_a$ is larger than $Q_X$ in FIG. 6), the routine goes to step 73 and the changing engine load $Q_a$ is reduced by q, and when $\Delta T > 0$, $Q_a$ is reduced by q at every processing cycle, and thus becomes close to $Q_X$. At step 74, the changing flag F2 is reset.

Figure 9:
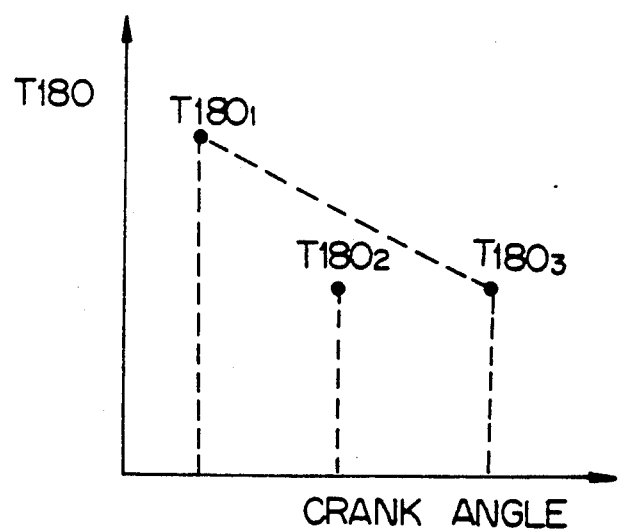
FIG. 9 is a diagram illustrating a relationship among $T180_1$, $T180_2$, and $T180_3$ in an acceleration engine running state.

Note, since $T180_2$ is compared with the average of $T180_1$ and $T180_3$, the first engine torque can be precisely compared with the second engine torque even during an acceleration or deceleration engine running state. Referring to FIG. 9, daring the acceleration engine running state, $T180_3$ is smaller than $T180_1$, and accordingly, the average of $T180_1$ and $T180_3$ can be compared with $T180_2$. In FIG. 9, since $T180_2$ is smaller than $(T180_1 + T180_3)/2$, the first engine torque is larger than the second engine torque.

Note, an average of T180 during the combustion stroke in the cylinders in which the fuel injection only during the compression stroke was carried out can be compared with the average of T180 during the combustion stroke in the cylinders in which the divided fuel injection was carried out.

As mentioned above, according to the first embodiment, since the changing engine load $Q_a$ can become close to $Q_X$, an optimum engine torque can be obtained, i.e., the full engine torque can be obtained.

Furthermore, since the torque difference at the changing engine load can be made smaller, a torque shock is prevented when the control pattern of the fuel injection is changed.

A second embodiment of the present invention is now described with reference to FIGS. 10 and 11.

Figure 10:
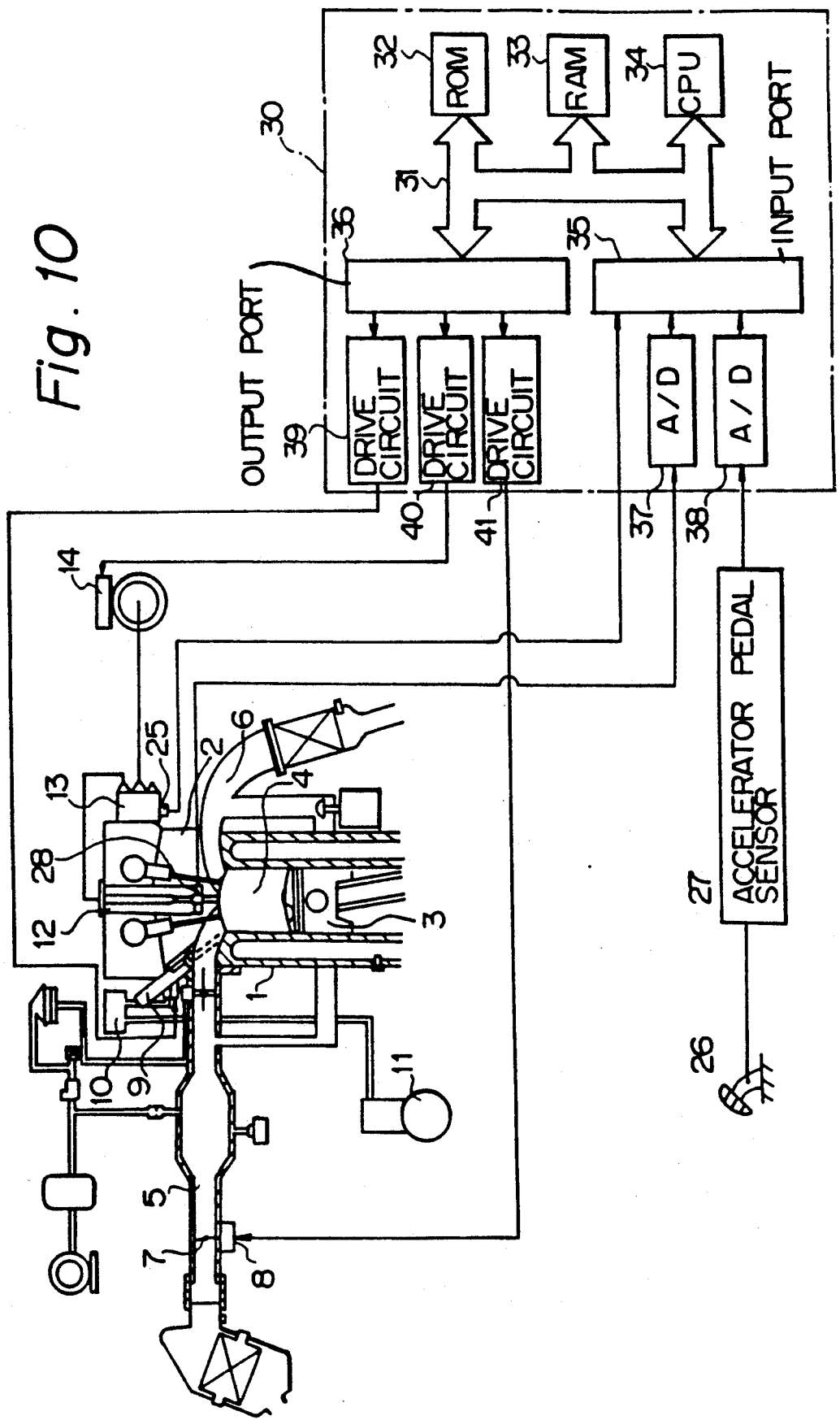
FIG. 10 is a schematic view of a four-cylinder gasoline engine to which the second and third embodiments of the present invention are applied.

In FIG. 10, the same parts are indicated by the same reference numbers as used in FIG. 1, and thus descriptions thereof are omitted.

Referring to FIG. 10, a pressure sensor 28 for detecting an absolute pressure in the cylinder chamber 4 is connected to the input port 35 via the AD converter 37.

Figure 11B:
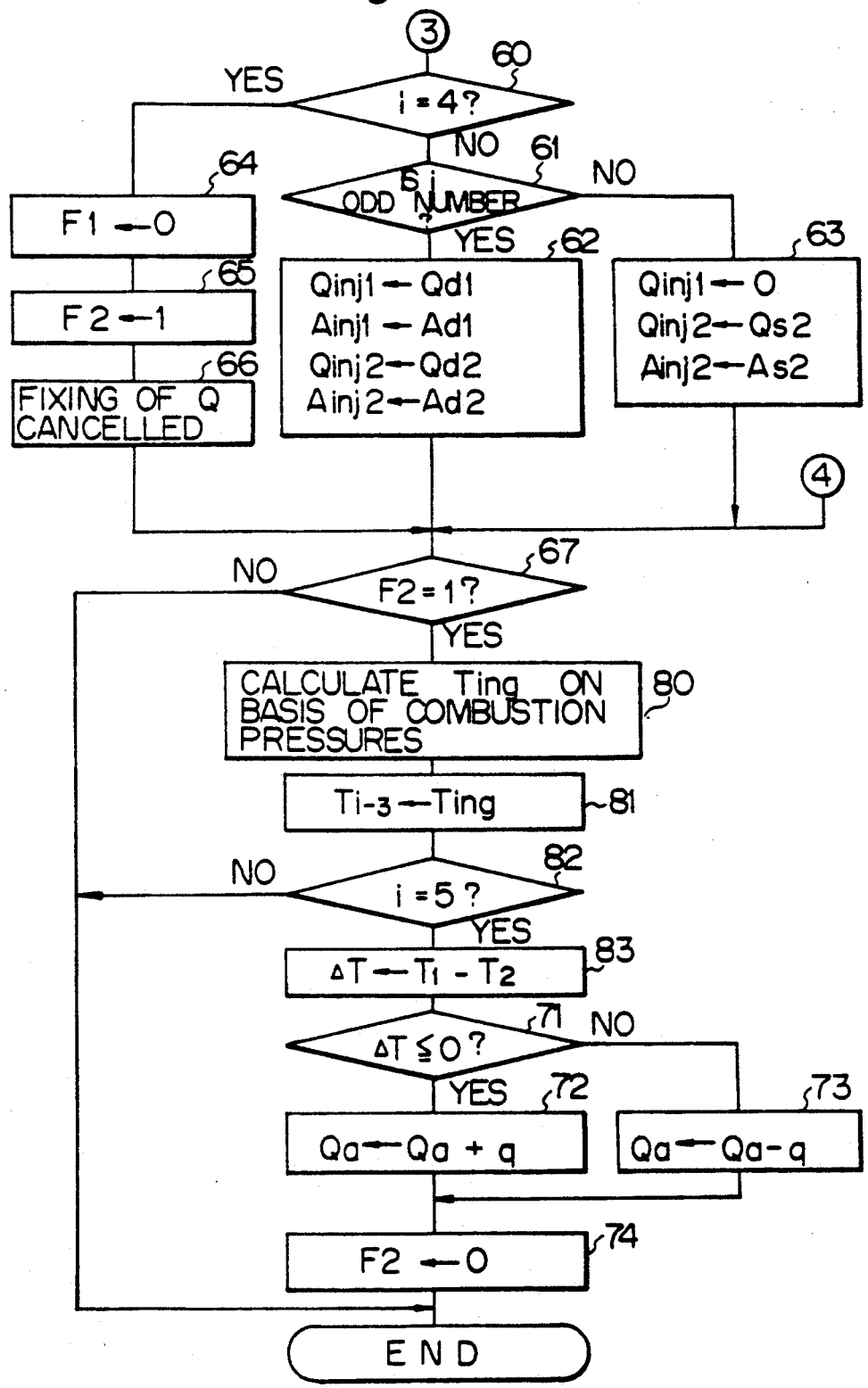

FIGS. 11A and 11B illustrate a routine for changing the changing engine load $Q_a$. This routine is processed by sequential interruptions executed at 180° CA. In FIGS. 11A and 11B, the same steps are indicated by the same step numbers as used in FIGS. 7A and 7B, and thus descriptions thereof are omitted.

Referring to FIGS. 11A and 11B, at step 80 an indicated torque $T_{ing}$ is calculated on the basis of the combustion pressures detected by the pressure sensor 28 at predetermined crank angles, and at step 81, $T_{ing}$ is stored in $T_{i-3}$. When i is equal to 4, the routine goes to step 81 for the first time and $T_{ing}$ is stored in $T_1$. The $T_{ing}$ calculated when i=4 designates the indicated torque during which i is equal to 3. As shown in FIG. 8, the period during which i is equal to 3 is the combustion stroke in No 1 cylinder, and thus $T_1$ designates the indicated torque produced by the combustion in No. 1 cylinder when the divided fuel injection was carried out. Similarly, $T_2$ designates the indicated torque produced by the combustion in No. 3 cylinder when the fuel injection only during the compression stroke was carried out.

At step 82, it is determined whether or not i is equal to 5. When i=4, the routine is completed. Conversely, when i=5, the routine goes to step 83 and $\Delta T$ is calculated from the following equation.

$$\Delta T = T_1 - T_2$$

where $T_1$: the indicated torque produced by the combustion in the cylinder when the divided fuel injection was carried out where $T_2$: the indicated torque produced by the combustion in the cylinder when the fuel injection only during the compression stroke was carried out.

At step 71, it is determined whether or not $\Delta T$ is smaller than or equal to 0. When $\Delta T \leq 0 (T_1 \leq T_2)$, i.e., the first indicated torque during the combustion stroke in the cylinder in which the fuel injection only during the compression stroke was carried out is larger than the second indicated torque during the combustion stroke in the cylinder in which the divided fuel injection was carried out, the routine goes to step 72 and the changing engine load $Q_a$ is increased by q. Conversely, when $\Delta T > 0 (T_1 > T_2)$, i.e., the first indicated torque is smaller than the second indicated torque, the routine goes to step 73 and the changing engine load $Q_a$ is reduced by q.

As mentioned above, the second embodiment of the present invention obtains an effect similar to that obtained by the first embodiment.

Figure 12:
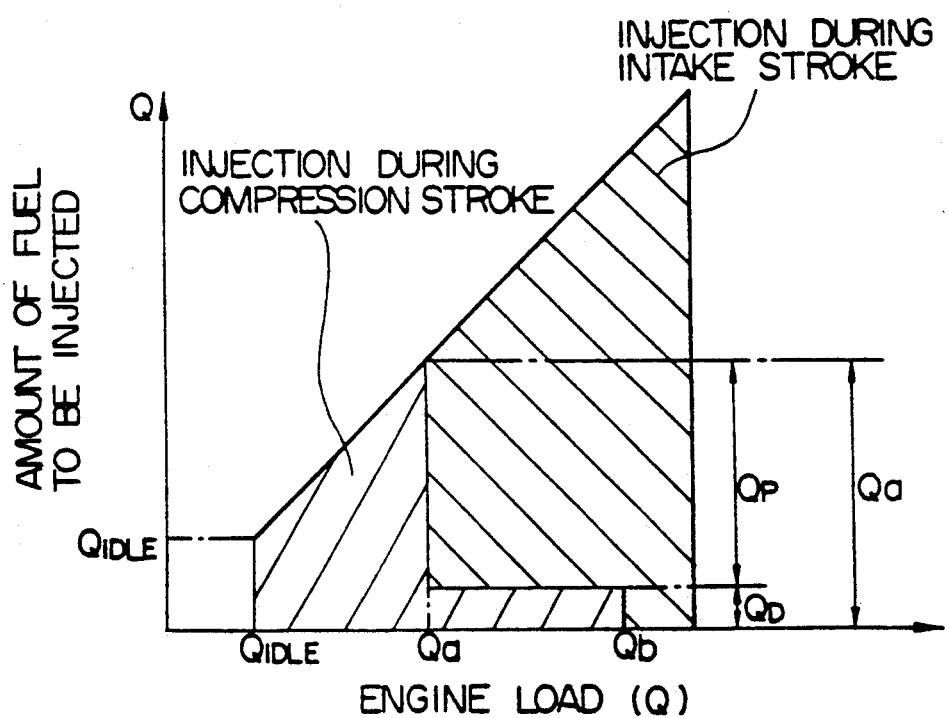
FIG. 12 is a diagram illustrating another control pattern of the fuel injection.

Note, a control pattern of the fuel injection is not limited in FIG. 3, for example, the control pattern of the fuel injection shown in FIG. 12 can be utilized for the first and second embodiments.

Referring to FIG. 12, when the calculated amount of fuel to be injected is larger than $Q_a$ and smaller than $Q_b$, a part of the calculated amount of fuel is injected during the intake stroke and a remaining part of the calculated amount of fuel is injected during the compression stroke. At this time, the amount of fuel to be injected during the compression stroke is constant at $Q_D$ and the amount of fuel to be injected during the intake stroke is increased in accordance with the increase of engine load.

When the calculated amount of fuel to be injected is larger than $Q_b$, all of the calculated amount of fuel is injected during the intake stroke, i.e., one fuel injection only during the intake stroke is carried out, because an air-fuel premixture formed by the fuel injected during the intake stroke is rich enough to be ignited. Where, $Q_b$ represents a minimum amount of fuel to be injected during the intake stroke for forming an air-fuel mixture which can be ignited by the spark plug 12, even when the injected fuel is uniformly diffused in the cylinder chamber 4.

The present invention can be applied to a changing of the changing engine load $Q_b$.

A third embodiment of the present invention is now described with reference to FIGS. 13A and 13B.

In the third embodiment., the changing engine load $Q_a$ is made $Q_X$ when an allowable engine load $Q_{OK}$ corresponding to a predetermined allowable production amount of $NO_X$ is larger than $Q_X$, and $Q_a$ is made close to the allowable engine load $Q_{OK}$ when $Q_{OK}$ is smaller than $Q_X$.

Since a first burning rate during the fuel injection only during the compression stroke is faster than a second burning rate during the divided fuel injection, the amount of $NO_X$ produced during the fuel injection only during the compression stroke is more than the amount of $NO_X$ produced during the divided fuel injection. Accordingly, when the changing engine load $Q_a$ is made smaller, i.e., the area of the fuel injection only during the compression stroke is made narrower, the amount of $NO_X$ produced can be reduced. Accordingly, when the amount of $NO_X$ produced is more than the predetermined allowable production amount, the changing engine load $Q_a$ is made smaller, and thus the amount of $NO_X$ produced is reduced. As shown in FIG. 6, however, when the changing engine load $Q_a$ becomes considerably smaller than $Q_X$, the output torque also becomes smaller and a considerable torque shock is felt. Therefore, in this embodiment, the amount of $NO_X$ produced is made less than the predetermined allowable amount produced, the full output torque is obtained, and the torque shock is reduced.

In this embodiment, the amount of $NO_X$ produced is represented by a maximum $(dP/d\theta)max$ of a rate of change of a combustion pressure P; where $\theta$ is a crank angle. When $(dP/d\theta)max$ is large, since the burning rate is fast and the combustion temperature is high, the amount of $NO_X$ produced is increased.

The third embodiment is applied to the engine shown in FIG. 10.

Figure 13B:
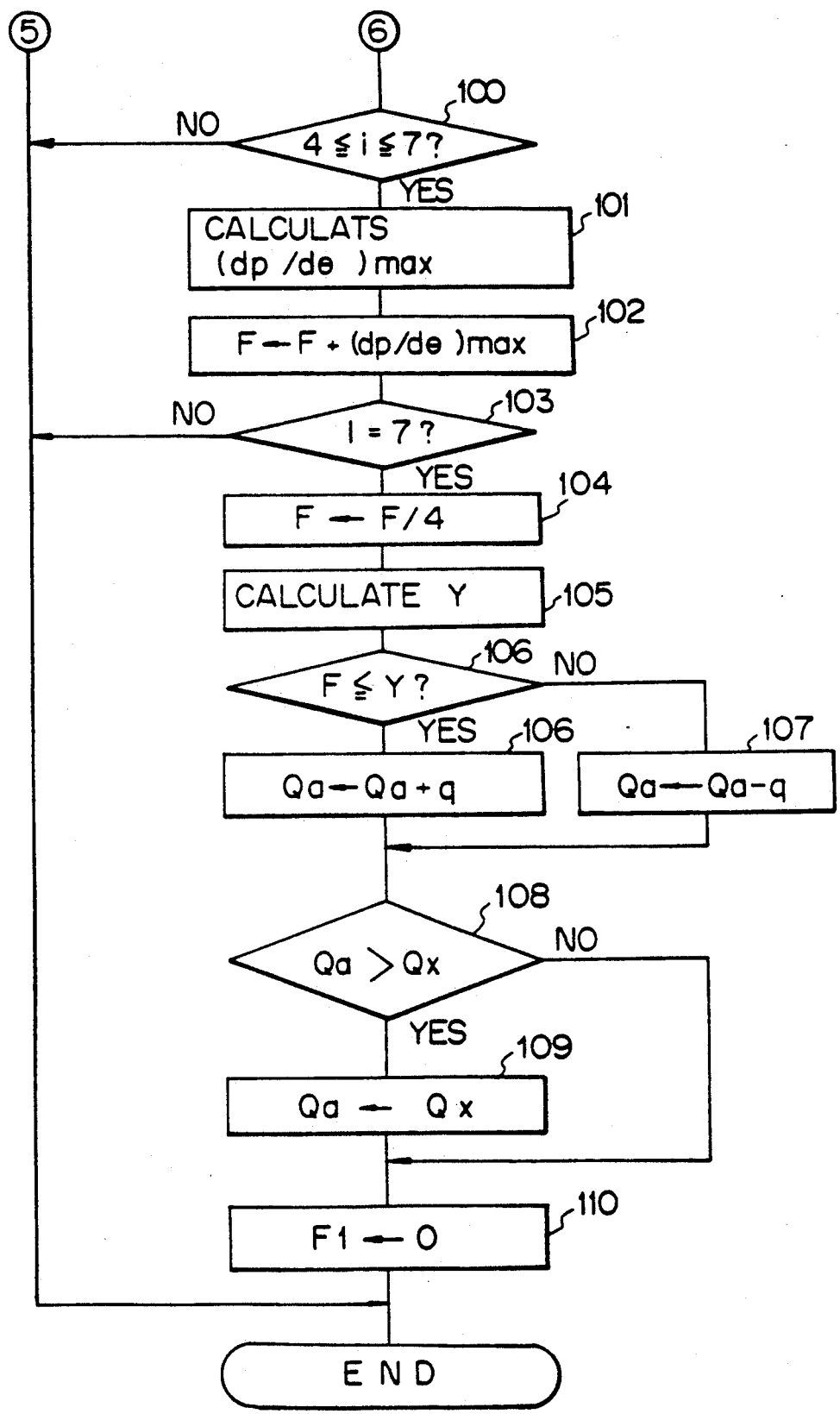

FIGS. 13A and 13B illustrate a routine for changing the changing engine load $Q_a$ according to this third embodiment. This routine is processed by sequential interruptions executed at 180° CA.

Referring to FIGS. 13A and 13B, at step 90, it is determined whether or not the control flag F1 is reset. When the control flag F1 is reset, the routine goes to step 91 and it is determined whether or not the following expression is satisfied.

$$Q_a \Delta \leqq Q \leqq Q_a + \Delta$$

When the result is NO, the routine is completed. Conversely, when the result is YES, the routine goes to step 92 and the control flag F1 is set. Then at step 93, the amount Q of fuel to be injected is fixed at $Q_a$. At step 94, the amount $Q_s2$ of fuel to be injected during the compression stroke and the fuel injection timing $A_s2$ during the compression stroke for the fuel injection only during the compression stroke are calculated on the basis of $Q_a$ and the engine speed $N_e$. At step 95, i is made 0, and at step 96, i is incremented by 1 at every 180° CA.

When the result is NO at step 90, steps 91 through 95 are skipped, and thus the routine skips to step 96. At step 97, it is determined whether or not i is smaller than or equal to 4, and as i is equal to 1, the routine goes to step 98. At step 98, $Q_{ing}1$ is mode 0, $Q_s2$ is stored in $Q_{inj}2$, and $A_s2$ is stored in $A_{inj}2$. Then the fuel injection only during the compression stroke is carried out, on the basis of $Q_{inj}2$ and $A_{inj}2$, by another routine (not shown). The fuel injection only during the compression stroke is carried out four times, until i becomes equal to 4. When i becomes equal to 5, the routine goes to step 99 and the fixing of Q at $Q_a$ is cancelled.

At step 100, it is determined whether or not i is smaller than or equal to 4 and equal to or larger than 7. When the result is NO, the routine is completed. When i becomes equal to 4, the result is YES and the routine goes to step 101. At step 101, the maximum $(dP/d\theta)max$ of the rate of change $(dP/d\theta)$ of a combustion pressure P is calculated. When i=4, the $(dP/d\theta)max$ during which i was equal to 3 is calculated.

The period during which i was equal to 3 was the combustion stroke in No. 1 cylinder (see FIG. 8), and thus the $(dP/d\theta)max$ during which i was equal to 3 was the $(dP/d\theta)max$ in No. 1 cylinder when the fuel injection only during the compression stroke was carried out. Then, when i is equal to 5 through 7, each of $(dP/d\theta)max$ corresponding to each cylinder is calculated respectively.

As step 102, $(dP/d\theta)max$ is accumulated and the cumulative $(dP/d\theta)max$ is stored in F. At step 103, it is determined whether or not i is equal to 7. When the result is NO, the routine is completed. Conversely, when i becomes equal to 7, the routine goes to step 104 and F is divided by 4, i.e., an average $(dP/d\theta)max$ is calculated. At step 105, an allowable value Y corresponding to the predetermined allowable amount of $NO_X$ produced is calculated on the basis of $N_e$. The allowable value Y is increased in accordance with the increase of $N_e$. At step 106, it is determined whether or not F, i.e., the average $(dP/d\theta)max$, is smaller than or equal to the allowable value Y. When $F \leqq Y$, the routine goes to step 106 and the changing engine load $Q_a$ is increased by q. Namely, when the amount of $NO_X$ produced is less than or equal to the allowable value Y, the area of the fuel injection only during the compression stroke is made wider. Conversely, when $F > Y$, the routine goes to step 107 and the changing engine load $Q_a$ is reduced by q. Namely, when the amount of $NO_X$ produced is more than the allowable value Y, the area of the fuel injection only during the compression stroke is made narrower, and thus the amount of $NO_X$ produced is reduced. Accordingly, $Q_a$ is controlled such that the average $(dP/d\theta)max$ becomes equal to Y.

At step 108, it is determined whether or not $Q_a > Q_X$ (see FIG. 6). When $Q_a > Q_X$, the routine goes to step 109 and $Q_a$ is made $Q_X$, and therefore, the output torque is made larger, the torque shock is reduced, and the amount of $NO_X$ produced is reduced. Conversely, when $Q_a \leq Q_X$, step 109 is skipped and $Q_a$ is maintained as is. Then, at step 110, F1 is reset.

Note, the control pattern of the fuel injection shown in FIG. 12 can be utilized for the third embodiment. Namely, the third embodiment can be applied to a change of the changing engine load $Q_b$. In this case, the amount of $NO_X$ produced during the divided fuel injection is more than the amount of $NO_X$ produced during the fuel injection only during the intake stroke. Accordingly, when the changing engine load $Q_X$ is made smaller, i.e., the area of the divided fuel injection is made narrower, the amount of $NO_X$ produced can be reduced. Therefore, when the amount of $NO_X$ produced is more than the predetermined allowable amount produced, the changing engine load $Q_b$ is made smaller, and thus the amount of $NO_X$ produced is reduced.

Further, the third embodiment can be utilized for reducing the amount of smoke produced, instead of the amount of $NO_X$ produced. In this case the amount of smoke produced is detected by an optical smoke sensor. The changing engine loads $Q_a$ and $Q_b$ are changed to be close to an allowable engine load corresponding to a predetermined allowable amount of smoke produced when the allowable engine load is smaller than $Q_X$. The predetermined allowable amount produced is increased in accordance with an increase of an engine speed $N_e$.

Further, in these embodiments, although a single injector carries out both the fuel injection only during the intake stroke and the fuel injection only during the compression stroke, two fuel injectors can be arranged in one cylinder, whereby one fuel injector can carry out the fuel injection only during the intake stroke and the other fuel injector can carry out the fuel injection only during the compression stroke. In this case, the one fuel injector for injecting fuel only during the intake stroke can be arranged in an intake port.

Although the invention has been described with reference to specific embodiments chosen for purposes of illustration, it should be apparent that numerous modifications can be made thereto without departing from the basic concept and scope of the invention.

I claim:

1. A fuel injection control device for an internal combustion engine having a cylinder, a piston introduced into the cylinder, and a fuel injector, said fuel injection control device comprising:
    a control means for controlling a control pattern of a fuel injection of the fuel injector to be a first control pattern when an engine load is smaller than a predetermined threshold engine load and to be a second control pattern when said engine load is larger than said predetermined threshold engine load;
    means for determining a performance of the engine; and
    a changing means for changing said predetermined threshold engine load while the engine is in the running state on the basis of the determined engine performance such that an optimum performance of the engine is obtained.

2. A fuel injection control device according to claim 1, wherein the fuel injector injects fuel directly into the cylinder.

3. A fuel injection control device according to claim 2, wherein a concave combustion chamber is formed in the top of the piston.

4. A fuel injection control device according to claim 3, wherein said fuel injector injects fuel toward said concave combustion chamber.

5. A fuel injection control device according to claim 4, wherein said concave combustion chamber comprises a shallow cavity and a deep cavity formed at an approximate center of said shallow cavity.

6. A fuel injection control device according to claim 1, wherein said first control pattern is represented by a fuel injection only during a compression stroke, and said second control pattern is represented by a divided fuel injection during both an intake stroke and the compression stroke.

7. A fuel injection control device according to claim 1, wherein said first control pattern is represented by a divided fuel injection during both an intake stroke and a compression stroke, and said second control pattern is represented by a fuel injection only during the intake stroke.

8. A fuel injection control device according to claim 1, wherein said performance of the engine is represented by an engine torque.

9. A fuel injection control device according to claim 8, wherein said changing means brings said predetermined threshold engine load close to a critical engine load at which a first engine torque produced by a combustion of fuel injected by said first control pattern is equal to a second engine torque produced by a combustion of fuel injected by said second control pattern.

10. A fuel injection control device according to claim 9, wherein said changing means increases said predetermined threshold engine load by a predetermined increasing value when said first engine torque is larger than said second engine torque when an amount of fuel to be injected is equal to an amount of fuel to be injected corresponding to said predetermined threshold engine load, and reduces said predetermined threshold engine load by a predetermined reducing value when said first engine torque is smaller than said second engine torque when said amount of fuel to be injected is equal to the amount of fuel to be injected corresponding to said predetermined threshold engine load.

11. A fuel injection control device according to claim 10, wherein said predetermined increasing value is equal to said predetermined reducing value.

12. A fuel injection control device according to claim 10, wherein said changing means compares a first average of a plurality of said first engine torques with a second average of a plurality of said second engine torques.

13. A fuel injection control device according to claim 12, wherein said first engine torques 'nd said second engine toques are detected alternately, in a firing order.

14. A fuel injection control device according to claim 12, wherein said first and second engine torques are detected on the basis of an engine speed.

15. A fuel injection control device according to claim 9, wherein said changing means brings said predetermined threshold engine load close to said critical engine load when an engine load is close to said predetermined threshold engine load.

16. A fuel injection control device according to claim 8, wherein the engine torque is detected on the basis of an engine speed.

17. A fuel injection control device according to claim 8, wherein the engine torque is detected on the basis of a combustion pressure in the cylinder 18. A fuel injection control device according to claim 1, wherein said performance of the engine is represented by an engine torque and a amount of $NO_X$ produced.

19. A fuel injection control device according to claim 18, wherein the amount of $NO_X$ produced is represented by a maximum of $dP/d\theta$.

where P: a combustion pressure in the cylinder
$\theta$: crank angle

20. A fuel injection control device according to claim 19, wherein the amount of $NO_X$ produced is represented by an average of a plurality of maximum $dP/d\theta$ at each of the total number of cylinders for which $dP/d\theta$ max has been calculated.

21. A fuel injection control device according to claim 18, wherein said changing means brings said predetermined threshold engine load close to an allowable engine load corresponding to a predetermined allowable amount of $NO_X$ produced when said allowable engine load is smaller than a critical engine load at which a first engine torque produced by a combustion of fuel injected by said first control pattern is equal to a second engine torque produced by a combustion of fuel injected by said second control pattern.

22. A fuel injection control device according to claim 21, wherein said changing means increases said predetermined threshold engine load by a predetermined increasing value when the amount of $NO_X$ produced by a combustion of fuel injected in said first control pattern is less than said predetermined allowable amount of $NO_X$ produced when an amount of fuel to be injected is equal to an amount of fuel to be injected corresponding to said predetermined threshold engine load, and reduces said predetermined threshold engine load by a predetermined reducing value when said amount of $NO_X$ produced by a combustion of fuel injected in said first control pattern is more than said predetermined allowable amount of $NO_X$ produced when the amount of fuel to be injected is equal to the amount of fuel to be injected corresponding to said predetermined threshold engine load.

23. A fuel injection control device according to claim 22, wherein said changing means increases or reduces said predetermined threshold engine load when an engine load is close to said predetermined threshold engine load.

24. A fuel injection control device according to claim 22, wherein said predetermined increasing value is equal to said predetermined reducing value.

25. A fuel injection control device according to claim 21, wherein said predetermined allowable amount of $NO_X$ produced is increased in accordance with an increase of an engine speed.

26. A fuel injection control device according to claim 21, wherein said changing means makes said predetermined threshold engine load equal to said critical engine load when said allowable engine load is larger than said critical engine load.

27. A fuel injection control device according to claim 1, wherein said performance of the engine is represented by an engine torque and a amount of smoke produced.

28. A fuel injection control device according to claim 27, wherein said amount of smoke produced is detected by an optical smoke sensor.

29. A fuel injection control device according to claim 27, wherein said changing means brings said predetermined threshold engine load close to an allowable engine load corresponding to a predetermined allowable amount of smoke produced when said allowable engine load is smaller than a critical engine load at which a first engine torque produced by a combustion of fuel injected by said first control pattern is equal to a second engine torque produced by a combustion of fuel injected by said second control pattern.

30. A fuel injection control device according to claim 29, wherein said predetermined allowable amount of smoke produced is increased in accordance with an increase of an engine speed.

* * * * *

UNITED STATES PATENT AND TRADEMARK OFFICE
CERTIFICATE OF CORRECTION

PATENT NO.   : 5,215,053
DATED        : June 1, 1993
INVENTOR(S)  : Yashshi ITO

It is certified that error appears in the above-identified patent and that said Letters Patent is hereby corrected as shown below:

Column 1, line 25, change "$NC_X$" to --$NO_X$--.

Column 9, line 65, change $Q_a - \Delta \leq Q \leq Q_a + \Delta$ to -- $Q_a - \Delta \leq Q \leq Q_a + \Delta$ --.

Column 11, line 10, change "$Q_X$" to --$Q_b$--.

Column 12, line 53, change "'nd" to --and--.

Column 12, line 54, change "toques" to --torques--.

Signed and Sealed this

Twelfth Day of July, 1994

*Attest:*

BRUCE LEHMAN

*Attesting Officer*       *Commissioner of Patents and Trademarks*